United States Patent [19]

Morriss, Jr.

[11] Patent Number: 4,708,373
[45] Date of Patent: Nov. 24, 1987

[54] TAPPING SLEEVE OR SERVICE CLAMP FOR USE IN ATTACHING A BRANCH PIPE TO A MAIN IN A FLUID SUPPLY SYSTEM

[76] Inventor: James C. Morriss, Jr., 140 Northwood, Nash, Tex. 75569

[21] Appl. No.: 2,418

[22] Filed: Jan. 12, 1987

[51] Int. Cl.$^4$ ............................................. F16L 41/00
[52] U.S. Cl. .................................. 285/156; 285/197; 285/373; 277/101
[58] Field of Search ............... 285/156, 197, 198, 199, 285/373, 419, 910, 15; 277/101, 9; 138/99

[56] References Cited

U.S. PATENT DOCUMENTS

| | | | |
|---|---|---|---|
| 863,887 | 8/1907 | Stuttle | 285/373 |
| 1,928,316 | 9/1933 | Muto | 285/373 |
| 2,690,193 | 9/1954 | Smith | 285/373 |
| 2,936,186 | 5/1960 | Dunmire | 285/373 |
| 3,186,744 | 6/1965 | Smith et al. | 285/373 |
| 3,379,218 | 4/1968 | Conde | 138/99 |
| 3,558,162 | 1/1971 | Ferrai et al. | 285/197 |
| 4,365,393 | 12/1982 | Hauffe et al. | 285/373 |
| 4,391,458 | 7/1983 | Blakeley | 285/197 |

FOREIGN PATENT DOCUMENTS 1003871  1/1977  Canada .............................. 285/197

Primary Examiner—Richard J. Scanlan, Jr.
Assistant Examiner—Anthony Knight
Attorney, Agent, or Firm—Owen, Wickersham & Erickson

[57] ABSTRACT

A tapping sleeve or service clamp has first and second semi-cylindrical sleeve members that fit around a pipe having a side opening, one sleeve member with a fixed side branch which is aligned with said opening. The sleeve member has lug members at opposite ends which are drawn together by bolts. The sleeve member with the side branch has a first inner liner gasket having end portions extending well beyond its straight end edges that are fully tapered to a feather edge and armour strips that located under the lugs when the sleeve members are around the pipe. A second inner liner gasket is provided for the second sleeve member and has tapered end portions that terminate at opposite straight end edges of the second sleeve member with a substantial thickness only somewhat less than the nominal thickness of the second gasket. As the bolts are tightened to draw the lugs together in tightening the sleeve members on a pipe, the tapered gasket portions under the ends of the second sleeve member bear against the armour strips to provide increase sealing power.

3 Claims, 5 Drawing Figures

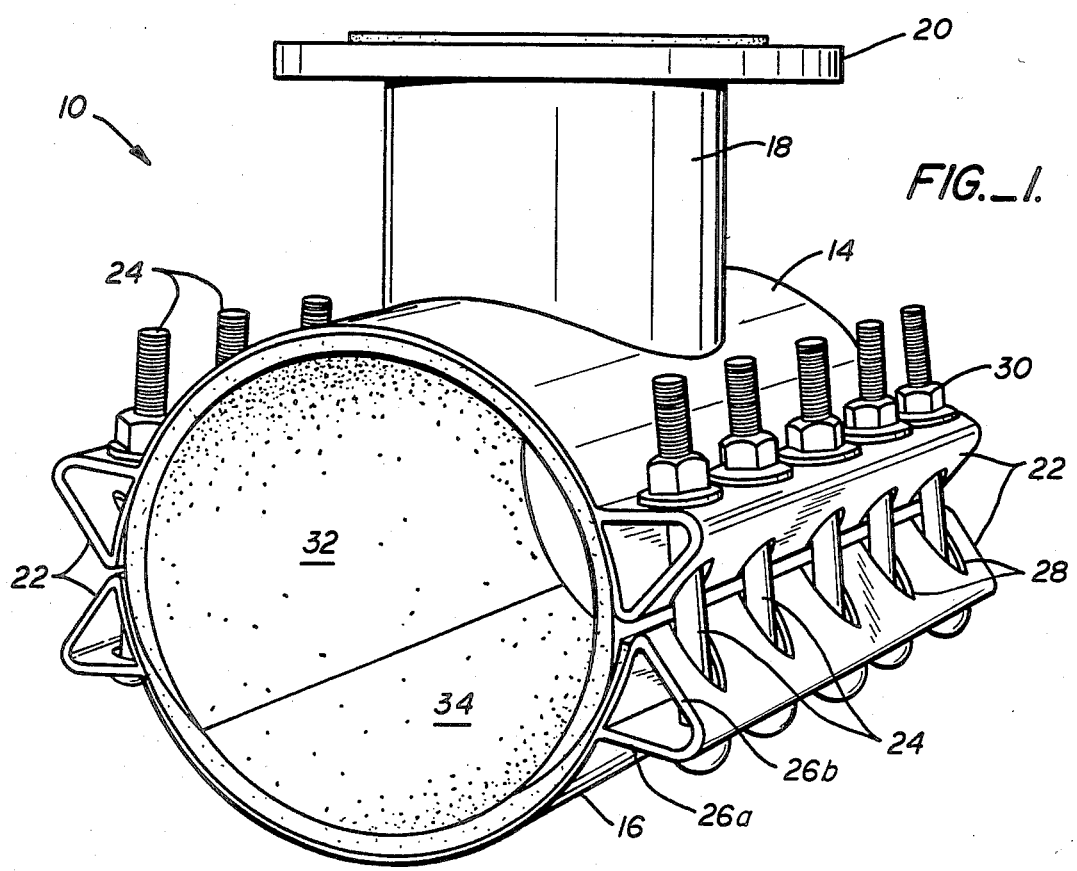
FIG._1.
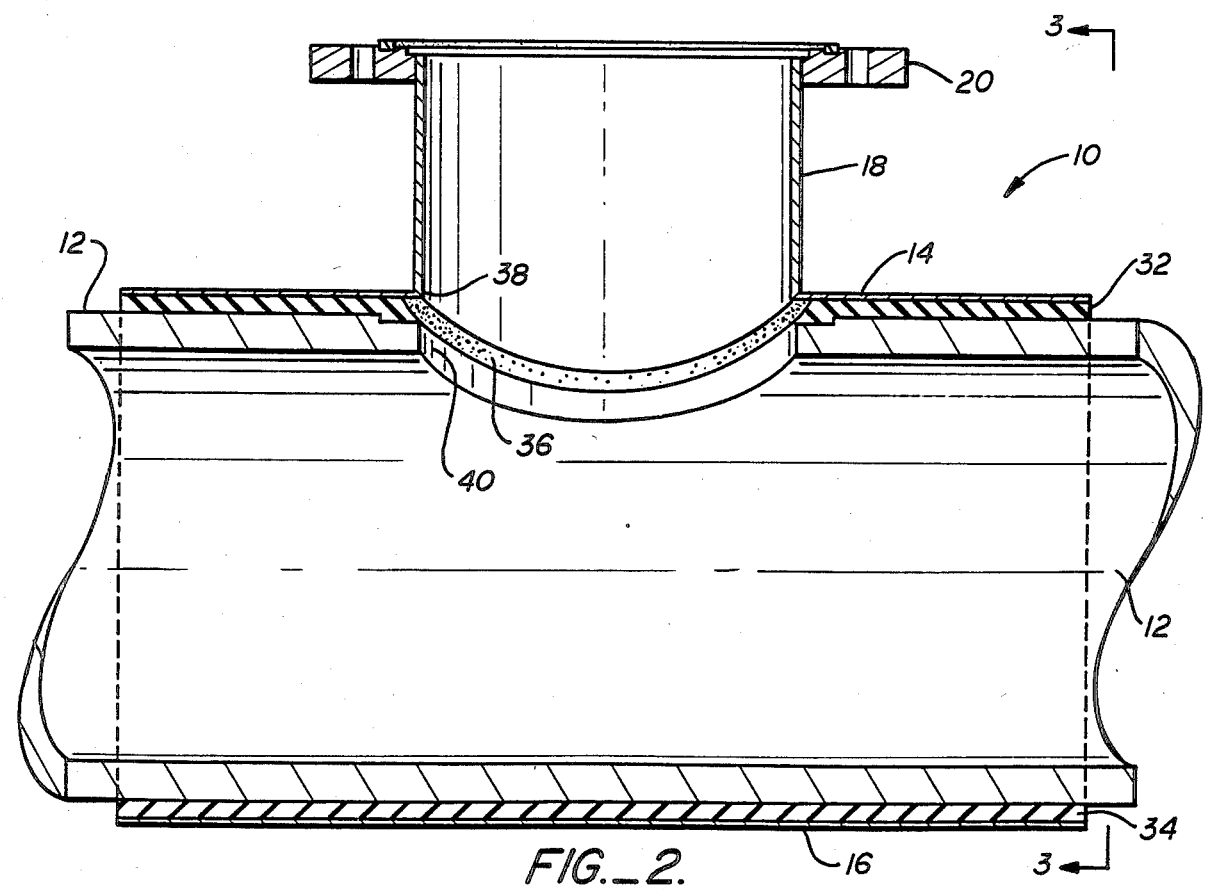
FIG._2.

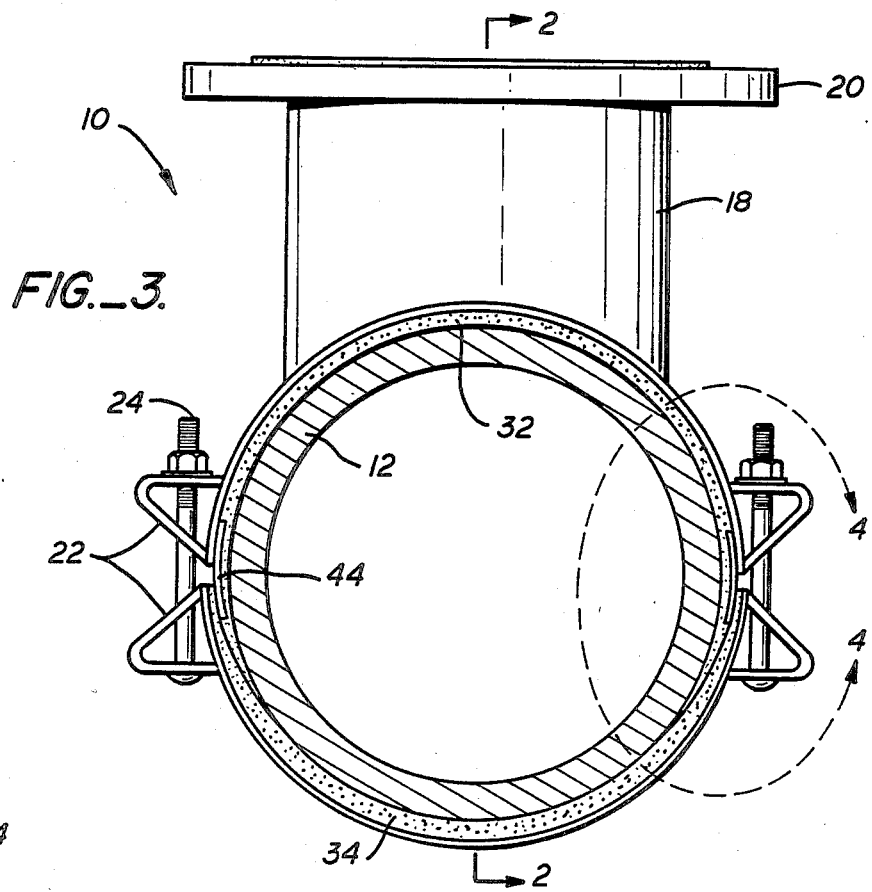
FIG._3.
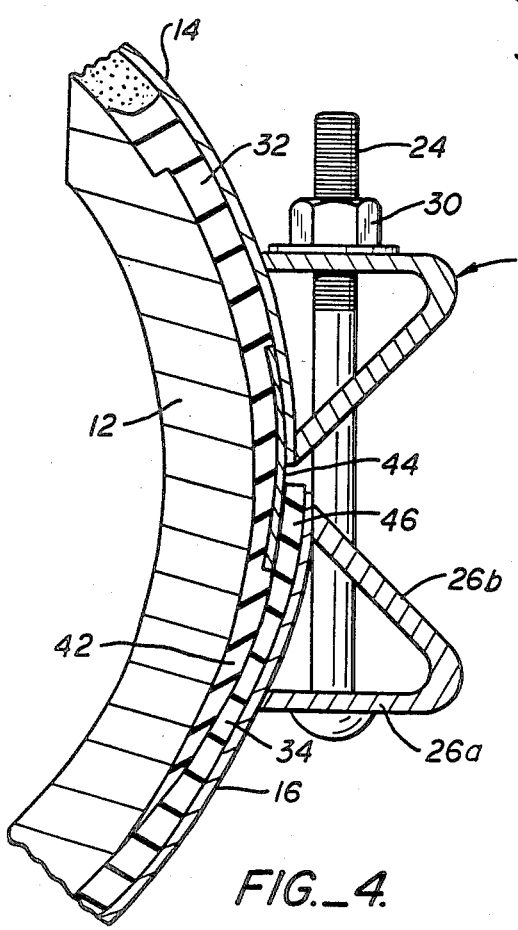
FIG._4.
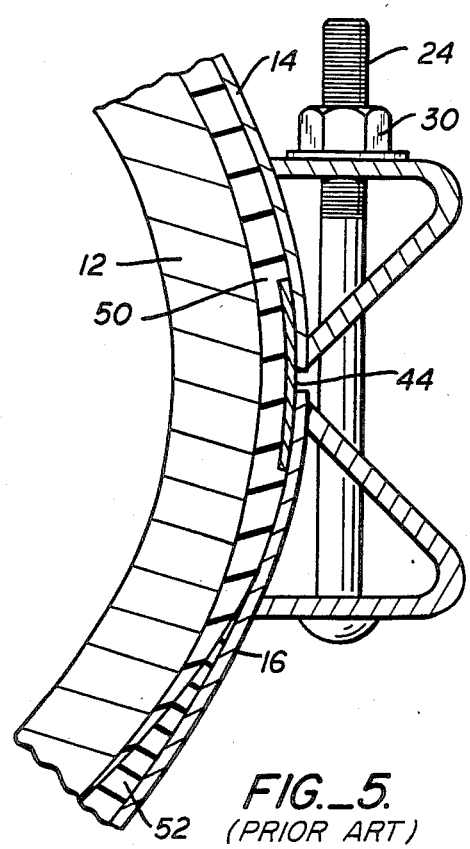
FIG._5.
(PRIOR ART)

TAPPING SLEEVE OR SERVICE CLAMP FOR USE IN ATTACHING A BRANCH PIPE TO A MAIN IN A FLUID SUPPLY SYSTEM

This invention relates to an improved tapping sleeve or service clamp for use in attaching a branch pipe to a main in a fluid supply system.

BACKGROUND OF THE INVENTION

In service clamps, as heretofore devised, a sleeve provided in two sections was adapted for attachment to a main supply conduit, one sleeve section having a side branching outlet which was aligned with a side opening in the conduit. The sleeve sections, secured around the main conduit were held together by bolts and a gasket means was provided under the sleeve sections to prevent leakage from the side opening. For such a device, the sleeve sections adapted to fit around the main pipe were formed as a flexible band from sheet metal, and lug members were attached to the ends of the band sections to support the bolts which were used to tighten the band sections around the main pipe. A problem arose with such flexible sleeve type devices with regard to leakage under the band. Heretofore, each sleeve section was provided with a gasket liner of elastomeric material having a generally uniform thickness and the gasket for each sleeve section was cemented to its inner surface. Also, with prior sleeve sections the gaskets were tapered at both ends on each sleeve section so that the tapered portions overlapped when the sleeve sections were installed on a pipe or main conduit. When installed the opposing sleeve lugs on the two mating sleeve sections were located on an armour strip of sheet metal that was embedded in the outer surface of the gasket. Because of slight flexure of the sleeve sections in the lug areas due to forces on the lugs as the bolts were tightened, some leakage often occurred from under the gasket in the lug area. In many instances such leakage persisted even through the bolts interconnecting the two sleeve sections were torqued to a relative high degree. The present invention provides a solution to this leakage problem without the necessity of using excessive torque on the bolts.

SUMMARY OF THE INVENTION

The present invention is particularly adapted for use on a tapping sleeve or service clamp comprised of two semi-cylindrical half sleeve members formed from sheet metal and having lug members attached to opposite ends of each half-sleeve member. The lug members have a triangular shaped cross-section and aligned holes to receive a series of tightening bolts. A first half-sleeve section has an attached branching outlet member which is preferably flanged so that it can be connected to a branching pipe. A first sheet type gasket member is bonded to the inside surface of the first half-sleeve member and has an opening that is aligned with its side branching outlet. This first gasket member also has embedded armour strips of sheet metal extending along its length and spaced near its opposite ends. Fully tapered end portions of this first gasket member extend beyond the longitudinal straight edges of the first semi-cylindrical sleeve section. The second gasket member on a second, opposite sleeve section of the service clamp terminates along its straight, longitudinal edges of the sleeve end portions which support the end lugs. Although both ends of this second gasket member are tapered somewhat, the gasket has a substantially greater thickness along these end edges than the fully tapered ends of the first gasket member. When the two sleeve sections are together around the main pipe, the second gasket member extends over the ends of the first gasket member and over the two armour strips thereon. As the bolts are tightened, the relatively thick ends of the second gasket member are pressed against the armour strips on the extended end portions of the first gasket member. The added thickness of elastomeric material afforded by the second gasket member serves to increase pressure on the pipe surface an provide an unusually effective sealing action which prevents leakage from the device. The new sealing action afforded is obtained without the necessity of exerting excessive torgue on the bolts, which might tend to weaken the main conduit or device itself.

Other objects, advantages and features of the invention will become apparent from the following detailed description of one embodiment thereof, presented in conjunction with accompanying drawings.

BRIEF DESCRIPTION OF THE DRAWING

FIG. 1 is a view in perspective of a tapping sleeve device according to the present invention.

FIG. 2 is a view in elevation and in section of the tapping sleeve shown in FIG. 1.

FIG. 3 is a view in section taken along line 3—3 of FIG. 2.

FIG. 4 is an enlarged fragmentary view of the tapping sleeve device of FIG. 3, taken along line 4—4 thereof.

FIG. 5 is a fragmentary view in section similar to FIG. 4 showing a tapping sleeve having a gasket means according to the prior art.

DETAILED DESCRIPTION OF EMBODIMENT

With reference to the drawing, FIG. 1 shows a tapping sleeve device 10 embodying principles of the present invention, which may be used to connect a branch pipe or some other component (not shown) to the side of a main fluid conduit 12 (FIG. 2). In general, the device comprises a pair of semi-cylindrical sleeve members 14 and 16 which are adapted to be clamped to the main conduit 12. These sleeve members are preferably formed from a sheet of strong but flexible sheet metal such as stainless steel. One member 14 is fixed, as by welding, to a short cylindrical boss section 18 having an outer flange 20 which enables it to be readily connected to a branch pipe.

Attached to the opposite ends of each semi-cylindrical sleeve member are pairs of lug members 22 which are adapted to retain a series of bolts 24 for holding the sleeve members together on the main conduit. In the embodiment shown, the lug members are also formed from an elongated strip of sheet metal material of uniform width, preferably stainless steel of a heavier gauge than that of the sleeve members. Each lug member 22 is bent to form an acute angle with two diverging inner and outer leg members 26a and 26b. The edges of the leg members are welded to the outer surface of each sleeve member near its end one, one lug for accommodating a plurality of bolts is provided at each end of both sleeve members. Pairs of aligned holes 28 are provided in the lug leg members to accommodate the bolts 24. Thus, when the sleeve members 14 and 16 are located around the main conduit, bolts 24 extend through the holes 28 of the two opposing lug members 22 on both sleeve members. On one lug, the inner leg member 26a retains the head ends of the bolts and on the other lug member on the opposite sleeve member, the inner leg supports a series of tightening nuts 30 for the bolts.

When the two half-sleeve members are installed on the main conduit, a gasket means must be provided to prevent leakage of fluid from the main conduit as fluid flows from the main conduit through the outlet boss member 18 and an attached branching pipe. In accordance with the present invention, the gasket means, as shown in FIG. 1 comprises a first gasket member 32 for the sleeve member 14 and a second gasket member 34 for the sleeve member 16. Both gasket members are made from a sheet of elastomeric material which is fairly soft but resilient, having a durometer of around 55-60. Also, both gasket members are preferably smooth on one side and have an embossed pattern or grid of indentations or grooves on the opposite side. The smooth side of each gasket member is bonded to the inside of its sleeve member so that its embossed, inner side contacts the outer surface of the main conduit or pipe 12.

The first gasket member 32 for the sleeve member 14 has a central opening 36 which coincides with an opening 38 in the sleeve member 14 for the boss section 18 and a side opening 40 in the main conduit. As shown in FIG. 2, the edge around the gasket opening 36 extends back at an angle away from the edge of the main conduit opening. This forms an annular recess which retains fluid at a pressure that tends to retain the gasket in sealing engagement with the adjacent surface of the main conduit 12 around its side opening 40.

As shown in FIGS. 1 and 3, the first gasket member 32 has a pair of opposite end portions 42 which extend well beyond the straight, axially aligned end edges of the sleeve member 14, and as they extend further around the main conduit 12, they are tapered in cross-section down to a feather edge. Extending longitudinally along the top surface of each tapered end portion is an embedded strip 44 of sheet metal, commonly referred to as an armour strip.

The second gasket member 34, bonded to the sleeve member 16 has a somewhat different configuration than the gasket member 32. First of all, as shown best in FIG. 4 a pair of end portions 46 of gasket member 34 are tapered in thickness, but not to a fully feathered edge as with the gasket member 32. On the contrary, in accordance with the present invention these gasket end portion 46 are truncated and terminate along the straight, axially aligned end edges of the sleeve member 16. At this point the ends of the second gasket member have a substantial thickness of elastomeric material under the end of the sleeve member 16 which is at least 25% of the full thickness of the gasket member. Thus, as shown, each end of the sleeve member 16 under the lug members bears against a thickness of elastomeric material afforded by the gasket end portion 46 which in turn bears against the armour strips 44 in the upper gasket member 32.

When the tapping device 10 is installed on a main conduit having a side opening, the sleeve members 14 and 16 with their attached gaskets 32 and 34 are installed around the main conduit 12 so that the branching boss member 18 is in line with the conduit's side opening 40. The bolts 28 are then installed through the openings in the opposing sets of lugs at both ends of the sleeve members 14 and 16. The nuts 30 on the bolts are then taken up to draw the sleeve members together and thereby press the sealing gasket members 32 and 34 against the outer surface of the main conduit. As the bolts are torqued higher to tighten the sleeve members in place, the sleeve member 16, and thus its gasket member 34, slides progressively into place over the armour strips 44 at both ends of the sleeve member 16. At this point, the additional thickness of elastomeric gasket material on the end portions 46 of the gasket member 34 located under the edge of the sleeve member 16 causes increased pressure on the embedded armour strips 44. The result is an extremely forceful and positive sealing action which prevents any leakage from the device 10 even with a minimal amount of torque applied to bolts.

The important structural differences afforded by the present invention as compared with the arrangement of the prior art may be readily seen by comparison of FIGS. 4 and 5. FIG. 5 shows the prior art arrangement wherein the end portions of both upper and lower gasket members 50 and 52 are fully feathered. Moreover, in the prior art arrangement the end portions of both sleeve members including the lower sleeve member 16, contact the armour strip 44 without any elastomeric gasket material between the two metal surfaces, as shown in FIG. 5. Tests have established that with all other conditions being the same (e.g. the same amount of bolt torque), the arrangement according to the invention in FIG. 4 prevented leakage from the conduit 12 at a much higher pressure level than that afforded by the prior art arrangement of FIG. 5.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A service for providing a branch line to a main conduit comprising:

a pair of semi-cylindrical sleeve members of equal diameter having end edges, one of said sleeve members having a side branch boss member adapted to be aligned with a side opening in the main conduit;

lug means fixed to the opposite ends of said sleeve members, said lug means of one said sleeve member being spaced from the lug means on the opposite sleeve member when the service clamp is installed on the main conduit;

bolt means extending through opposed lug means at opposite ends of said sleeve members and nut means on said bolt means for drawing said opposed lug means together;

a first gasket member adjacent the inside surface of said first sleeve member having end portions that extend well beyond the end edges of said first sleeve member, said gasket end portions being fully tapered to a feathered edge, so that said first gasket member extends considerably more than half-way around said main conduit and an armour strip of metal embedded in the top surface of each tapered end portion;

a second gasket member adjacent the inside surface of said second sleeve member and having partially tapered but truncated end portions that terminate along the end edges of said second sleeve member with a thickness that is a substantial percentage of the nominal gasket thickness;

whereby said second gasket end portions bear against the outer surface of said armour strips on said first gasket member to provide increased sealing power as said bolt means are tightened.

2. The service clamp as described in claim 1 wherein said sleeve membes, said branch boss member and said lug means are formed from stainless sheet steel material and the thickness of said truncated end portions of said second gasket member is at least 25% of the nominal gasket thickness.

3. The service clamp as described in claim 1 wherein the thickness of each said truncated end portion of said second gasket member on top of a said armour strip added to the thickness of said tapered end portion of said first gasket member under said armour strip is somewhat greater than the nominal thickness of said gasket members when said service clamp is installed on the main conduit with its bolts means being tightened.

* * * * *